March 3, 1964 — W. L. MILLER — 3,123,273
CUP FOR HOT BEVERAGES

Filed Jan. 9, 1961 — 3 Sheets-Sheet 1

INVENTOR.
WILLIAM L. MILLER
BY
Mason, Porter, Diller & Stewart
ATTORNEYS

March 3, 1964

W. L. MILLER 3,123,273

CUP FOR HOT BEVERAGES

Filed Jan. 9, 1961

INVENTOR.
WILLIAM L. MILLER

BY

*Mason, Porter, Diller & Stewart*
ATTORNEYS

March 3, 1964 W. L. MILLER 3,123,273
CUP FOR HOT BEVERAGES
Filed Jan. 9, 1961 3 Sheets-Sheet 3
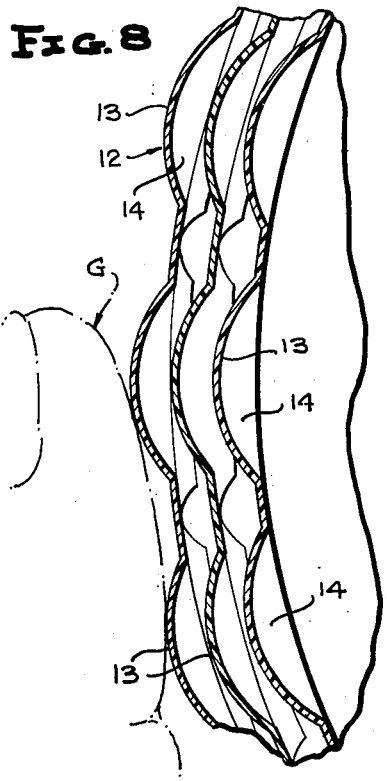
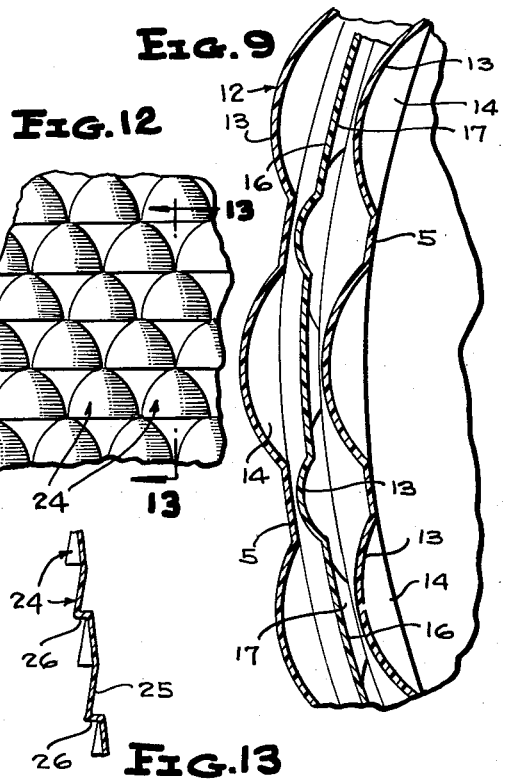
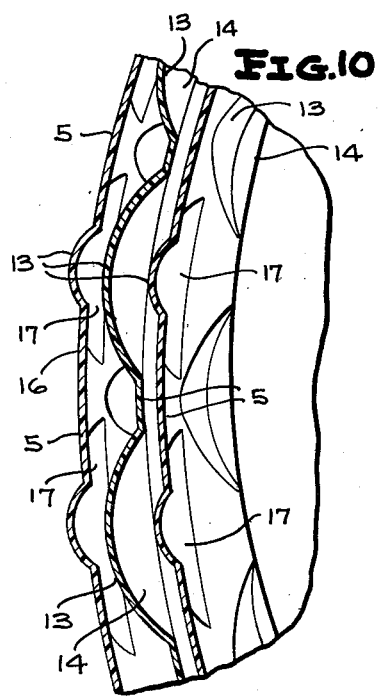
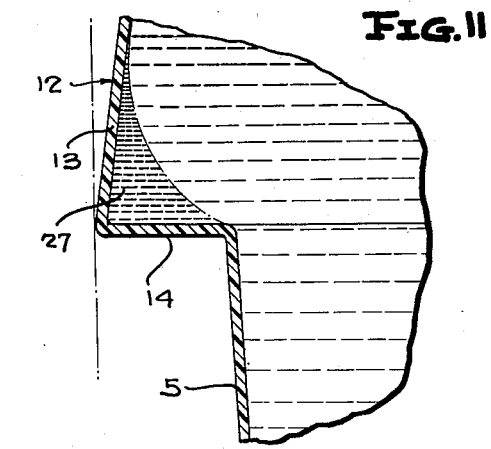
INVENTOR.
WILLIAM L. MILLER
BY
Mason, Porter, Diller & Stewart
ATTORNEYS United States Patent Office 3,123,273
Patented Mar. 3, 1964

3,123,273
CUP FOR HOT BEVERAGES
William L. Miller, Skokie, Ill., assignor to Continental Can Company, Inc., New York, N.Y., a corporation of New York
Filed Jan. 9, 1961, Ser. No. 81,390
17 Claims. (Cl. 229—1.5)

The invention relates generally to drinking cups and seeks to provide a novel form of all plastic cup which can be used in holding hot beverages, and which may be nested or stacked in and dispensed from vending machines, or in other uses, without any problem of sticking, one cup within another.

Plastic cups are known and it has also been the practice to stack these and other types of cups such as the well known wax coated cups preparatory to individual uses thereof, as in vending machines from which hot beverages are dispensed. However, problems have been encountered in these prior uses such as wedging or sticking of stacked cups one within another in such manner as to prevent proper individual dispensing of the cups, and the discomfort experienced by persons holding in their hands cups filled with hot beverages and due to rapid transfer of heat to the hands of such persons through the walls of the cups from the hot beverage within.

An object of the invention is to provide an improved cup structure wherein the above mentioned problems of sticking of the cups when nested, or of objectionable heat transfer are eliminated by provision of a novel thin walled finger gripping band about the cup composed of thin walled closely spaced outward protuberances providing for a very efficient and secure finger gripping action without undue pressure application and without large area finger contact such as would cause heat transfer which would be objectionable, provision also being made against wedging or frictional contacts of any cup body wall portions within the gripping band such as would cause sticking of nested cups.

Another object of the invention is to provide a cup structure of the character stated wherein the protuberances of the finger gripping band are spaced from one another both circumferentially about the band and along the band and yet lie so closely in relation one to another that a finger or thumb of a person gripping the cup will engage only small area peak portions of the protuberances and not main body wall portions between protuberances, the spacing providing for heat dissipating air circulation about and between the protuberances throughout the band area and even where peak portions thereof are being gripped.

Another object of the invention is to provide a cup structure of the character stated wherein the protuberances are arranged in symmetrical rows, there being multiple rows, and alternate rows being staggered with relation to the other rows.

Another object of the invention is to provide a cup structure of the character stated wherein at least some of the protuberances are defined by wall portions bearing acute angular relation effective to hold liquid fillet-like portions in heat dissipating contact with said protuberances and against free circulation in hot liquid which may be contained in the cup.

Another object of the invention is to provide a cup structure of the character stated wherein each protuberance is of generally tringular shape, the protuberances being arranged in row relation with their bases in line and each presenting a downwardly facing generally horizontal shoulder.

A further object of the invention is to provide a cup structure of the character stated wherein the thin walled gripping band also includes outward grooving intersecting the protuberance rows, and there also are included stop means adjacent the bottom of the cup and engageable by a bottom portion of a like nested cup to determine the positioning of a cup in a cup within which it is nested, the stop means being cooperatively spaced with relation to the protuberances and intersecting grooving in a manner for assuring against wall nesting contact such as could provide sticking of cups one within another.

A still further object of the invention is to provide a cup structure of the character stated wherein the stop means comprises an inwardly directed generally horizontal shoulder spaced above the bottom extremity of a nested cup and which is engageable as a support for the bottom extremity of a nested cup, the cup body also including a cylindrical portion extending immediately above the stop shoulder and of a length considerably less than the spacing of the shoulder above the bottom extremity of the cup.

With the above and other objects in view that will hereinafter appear, the nature of the invention will be more clearly understood by reference to the following detailed description, the appended claims and the several views illustrated in the accompanying drawings.

Figure 5:
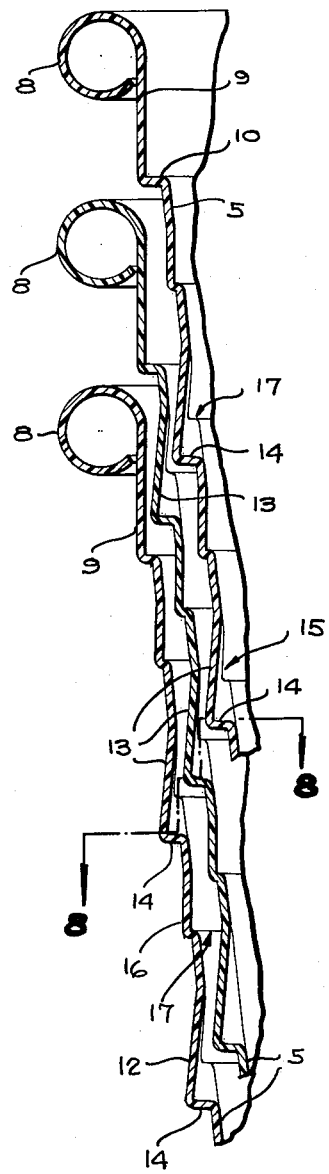
FIGURES 5, 6 and 7 are enlarged fragmentary sectional views through one side of a nest of three cups and each showing a different orientation of the rows of gripping protuberances in relation to the cooperating protuberance row intersecting grooving.
Figure 6:
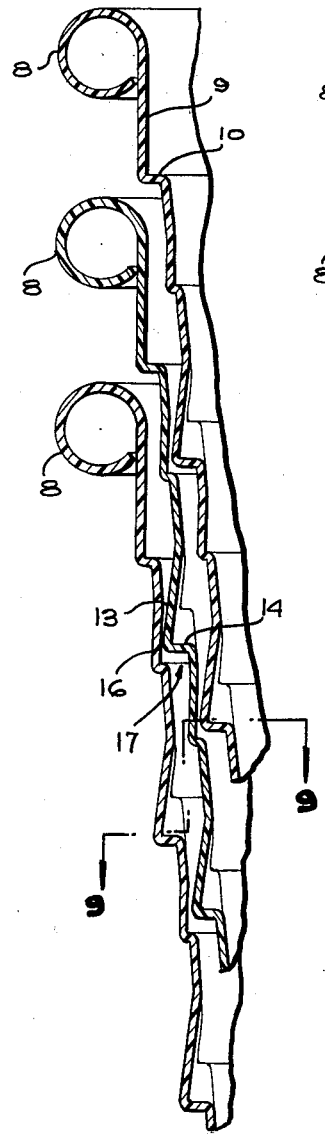
Figure 7:
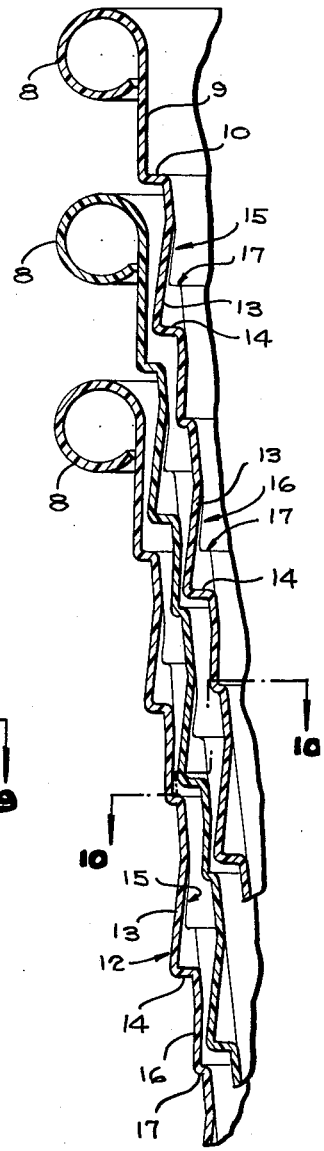

FIGURES 8, 9 and 10 are enlarged fragmentary horizontal sectional views taken on the lines 8—8, 9—9 and 10—10 on FIGURES 5, 6 and 7, respectively.

FIGURE 11 is an enlarged fragmentary sectional view through the peak portion or portion of greatest outward projection of one of the gripping band protuberances, the manner in which the acutely angled wall portions defining the downwardly facing shoulder of the protuberance serve to hold a liquid fillet-like portion being illustrated.

FIGURE 12 is a fragmentary side elevation illustrating a modified arrangement of the protuberances.

FIGURE 13 is a vertical cross section taken on the line 13—13 on FIGURE 12.

The improved hot beverage cup is molded or otherwise formed to provide a thin walled, generally frusto-conical body 5 having a bottom portion 6, a finger grip band 7 or body wall portion and an open top mouth defined by an outwardly turned curl 8. Formation of the cup structure by vacuum forming procedure and with stock for providing a .010 wall thickness throughout all portions of the cup structure is preferred. The cup mouth defining curl 8 merges downwardly into a cylindrical wall 9 which terminates in a downwardly presented shoulder 10 which in turn merges into the main body 5.

Figure 1:
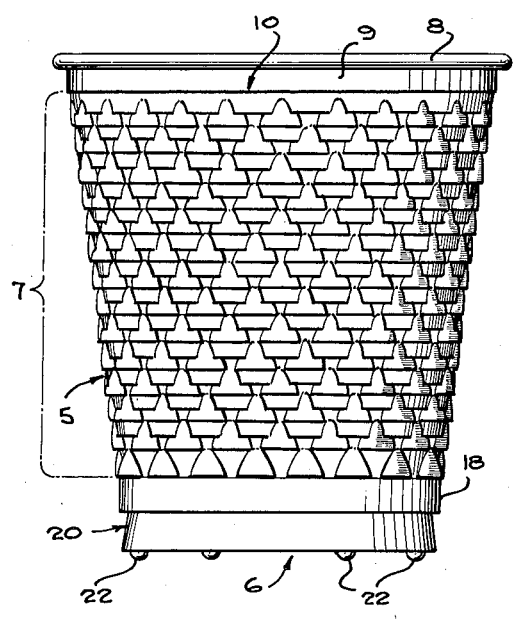
FIGURE 1 is a side elevation illustrating the improved cup structure.
Figure 3:
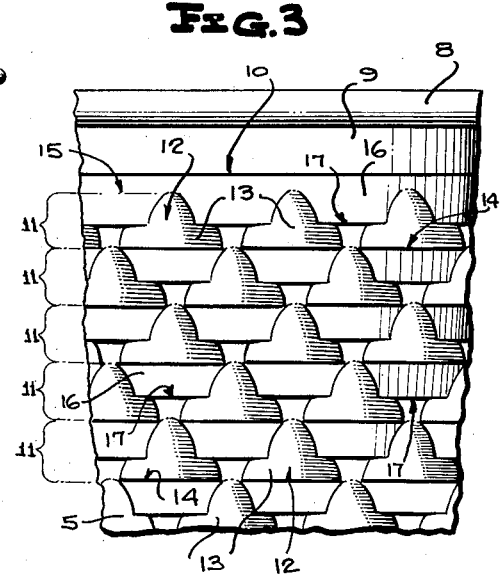
FIGURE 3 is an enlarged fragmentary side elevation illustrating a finger gripping band area.
Figure 2:
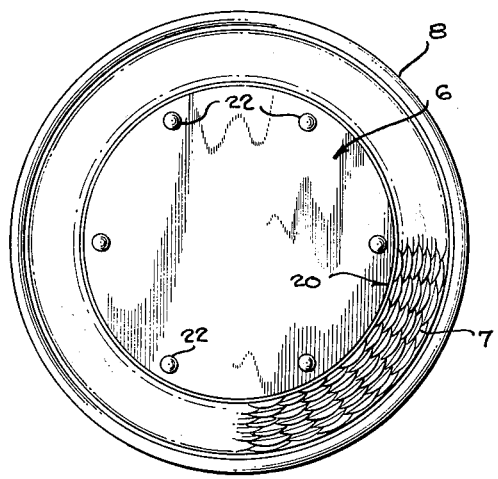
FIGURE 2 is a bottom plan view of the cup structure of FIGURE 1.

The finger grip band or body wall portion generally designated 7 is formed in the body 5 below the shoulder 10 and includes rows 11 of outward protuberances. The rows of protuberances are spaced longitudinally as indicated in FIGURES 1 and 3, and the individual protuberances in the several rows are spaced circumferentially about the cup body. Each protuberance generally designated 12 is generally triangular in shape and includes an outwardly arched wall 13 and a generally horizontal, downwardly facing base shoulder 14, all shoulders 14 being arranged in alignment as clearly illustrated in FIGURES 1 and 3 of the drawings. Each of the rows of protuberances except the lowermost row is intersected by a groove 15, each said intersecting groove providing an upright outwardly stepped wall 16 curved on an arc struck from the cup axis, the outwardly stepped wall 16 presenting generally horizontal downwardly facing shoulders 17, as will be clearly apparent by reference to FIGURES 3 and 5 through 7 of the drawings.

Figure 4:
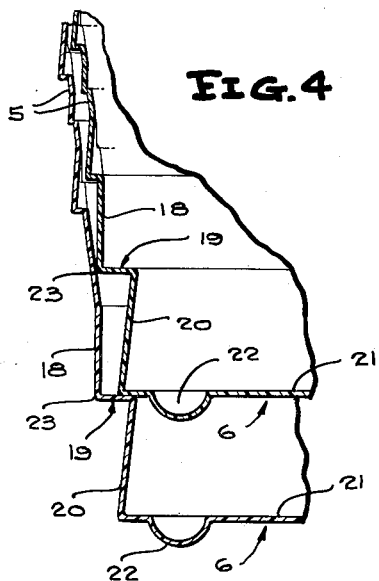
FIGURE 4 is an enlarged fragmentary sectional view illustrating the effectiveness of the stop means in definitely placing a nested cup within a cup with which it is nested.

At its lower end the downwardly tapering cup body 5 merges into a cylindrical portion 18 which terminates in an inwardly turned horizontal stop shoulder 19, as best shown in FIGURE 4. The annular stop shoulder 19 merges into a downwardly and outwardly flared wall generally designated 20 which in turn merges into a flat bottom wall 21 having depending protuberances 22.

It will be apparent by reference to FIGURES 1 and 4 that the particular bottom structure not only provides the desired cup nest position determining shoulder stop at 19, but it also serves to provide a rigid and strong bottom structure. It will be apparent by reference to FIGURE 4 that the length of the cylindrical portion 18 of the cup body is less than the spacing of the stop shoulder 19 above the bottom wall 21 of the cup which rests upon and is supported by the stop shoulder when cups are nested in the manner illustrated in FIGURE 4. This particular placement and spacing of parts places the stop shoulder on a nested cup well above the upper terminus of the cylindrical portion 18 of the cup within which the first mentioned cup is nested. This assures against wedging or sticking contact of cup bottom portions, and yet the proximity of the cup bottom portion corner 23 defined by the juncture of the shoulder 19 and the cylindrical wall portion 18 to the surrounding cup body 5 provides for a centering of the nested cup which additionally assures against any inter-engagement of the wall portions which would bring about sticking of one cup within another.

The particular nest determining stop arrangement shown in detail in FIGURE 4 serves to control the relative positioning of nested cups in the manner clearly illustrated in FIGURES 4, 5, 6 and 7. The stop means 19–21 is cooperatively spaced with relation to the rows of grooving 15 and rows of protuberances 12 so that the protuberances on a nested cup always will be lined up with the grooving in the cup in which it is nested and thus be cleared of any wall nesting contact of protuberances with the grooved gripping band wall portions. The effect of this novel arrangement of parts is clearly illustrated in FIGURE 5 wherein various orientations of three nested cups are illustrated in the several views. On FIGURE 5 the intermediate position of the three nested cups is sectioned on a line passing through the centers of three longitudinally aligned protuberances 12 whereas the innermost and outermost of the nested cups are oriented so that the line of section passes through two longitudinally aligned protuberances in the finger gripping band. The illustration shows that in this orientation of the three nested cups, there is no contact between opposing wall portions which could result in binding or sticking.

In FIGURES 6, all three of the nested cups are sectioned along a line passing through two longitudinally aligned protuberances 12, and it will be apparent that all of the peaks or points of greatest outward projection of the protuberances 12 are placed opposite grooving 15 in the finger gripping portion and no wall portions in the finger gripping band are presented for any sticking or binding contact.

In FIGURE 7, the section line with respect to three of the nested cups passes centrally through three longitudinally aligned protuberances 12, and again, with this orientation of the nested cups, the protuberances are placed and cleared so that sticking or binding contact of wall portions is impossible.

It will be noted that in all of the above mentioned orientations of nested cups, the particular placement of the rows of protuberances and the grooving with relation to the stop means 19–23 is such that the protuberance shoulders 14 are placed just above and inward of groove shoulders so that there can be no binding contact such as would cause sticking of nested cups.

A modified arrangement of protuberances and protuberance rows is shown in FIGURES 12 and 13. As in the previously described forms, the rows of protuberances are staggered so that the protuberances in alternate rows are disposed in longitudinal alignment and are staggered centrally between lines of like alignment of the protuberances in the rows with which said first mentioned alternate rows are alternated. In this modified showing, the protuberances generally designated 24 are thin walled and outwardly arched at 25. These protuberances also are generally triangular in shape and have the bases arranged in alignment to provide downwardly presented shoulders 26. Like the previously described protuberances, the angular relation of the shoulders 26 with the main bodies 25 of these protuberances may be acute so as to hold fillet-like portions of hot beverage.

In FIGURE 11 of the drawings, it is shown that the acute angular relation between the protuberance shoulder 14 and the protuberance body 13 brought about by the horizontal positioning of the shoulder and the upward and inward inclination of the protuberance wall 13 serves to hold a fillet-like portion 27 of liquid in heat dissipating contact with the protuberance and against free circulation in hot liquid which may be contained in the cup. The modified arrangement of protuberances shown in FIGURE 12 may be formed as illustrated in FIGURE 13 to provide the same fillet holding function.

In the described forms of cups, the gripping band or protuberance bearing body wall portion may be gripped in the manner illustrated at G in FIGURE 8, the spacing of the protuberances longitudinally and circumferentially being so close as to permit secure grasping without excess pressure application and without finger or thumb contact with body portions of the cup other than the protuberance peak portions. This assures against heat transfer from the hot beverage within the cup and which would be objectionable to a person holding the cup. The free circulation permitted about and between the protuberances of the finger gripping band or body wall portion, and even between gripped protuberances and body portions opposed by the gripping fingers, also provides heat dissipation and assures against discomfort of persons holding the cup with hot beverage therein.

While example disclosures of the improved cup structures are made herein, it is to be understood that modifications may be made without departing from the scope of the invention as outlined in the appended claims.

I claim:

1. A cup structure of the character described comprising a thin walled generally frusto-conical body, a bottom, an open mouth and a finger gripping band extending about the body beneath the mouth, said band being composed of a plurality of thin walled outward protuberances having small area peak portions, the outward protuberances being spaced from one another both circumferentially about the band and axially across the band and yet lying so closely in relation one to another that a finger or thumb of a person gripping the cup body at the band will engage only small area peak portions of the thin walled protuberances and not main body portions of the body between the protuberances and air circulating spacing will be provided between protuberances of the band and between thumb or finger portions engaging protuberances and body wall portions underlying and not contacted by said protuberance engaging thumb or finger portions.

2. A cup structure as defined in claim 1 wherein the peak portions of at least some of the protuberances are defined by wall portions bearing acute angular relation effective to hold liquid fillet-like portions in heat dissipating contact with said protuberances and against free circulation in hot liquid which may be contained in the cup.

3. A cup structure of the character described comprising a thin walled generally frusto-conical body, a bottom, an open mouth and a finger gripping band extending about the body beneath the mouth, said band being composed of a plurality of rows of thin walled outward protuberances extending in closely spaced symmetrical arrangement circumferentially about and axially across the cup, the thin walled finger gripping band also including outward grooving extending circumferentially thereabout, and there also being stop means adjacent the bottom of the cup and engageable by a bottom portion of a like nested cup to determine the positioning of a cup in a cup within which it is nested, said stop means being cooperatively spaced with relation to said grooving and said protuberance rows, so that the protuberances on a nested cup always will be lined up with the grooving in the cup in which it is nested and thus be cleared of any wall nesting contact of protuberances with said grooved band wall portions.

4. A cup structure as defined in claim 3 wherein the portions of at least some of the protuberances projecting the greatest distance outward are defined by wall portions bearing acute angular relation effective to hold liquid fillet-like portions in heat dissipating contact with said protuberances and against free circulation in hot liquid which may be contained in the cup.

5. A cup structure of the character described comprising a thin walled generally frusto-conical body, a bottom, an open mouth and a finger gripping band extending about the body beneath the mouth, said band being composed of a plurality of rows of thin walled outward protuberances extending in closely spaced symmetrical arrangement about the cup, the thin walled finger gripping band also including outward grooving extending circumferentially thereabout, each such grooving extending circumferentially about the cup and intersecting the protuberances of one of the protuberance rows, and there also being stop means adjacent the bottom of the cup and engageable by a bottom portion of a like nested cup to determine the positioning of a cup in a cup within which it is nested, said stop means being cooperatively spaced with relation to said grooving and said protuberance rows so that regardless of the particular orientation of a cup nested within another cup the protuberances on the nested cup will be placed for nesting clearance within a grooving in the cup in which it is nested or opposite protuberance portions intersected by the particular grooving.

6. A cup structure as defined in claim 5 wherein the portions of at least some of the protuberances projecting the greatest distance outward are defined by wall portions bearing acute angular relation effective to hold liquid fillet-like portions in heat dissipating contact with said protuberances and against free circulation in hot liquid which may be contained in the cup.

7. A cup structure of the character described comprising a thin walled generally frusto-conical body, a bottom, an open mouth and a finger gripping band extending about the body beneath the mouth, said band being composed of a plurality of rows of thin walled outward protuberances closely spaced in the direction of the length of the band and each row made up of protuberances symmetrically and closely spaced about the cup circumferentially, the spacing of said rows and the protuberances therein being so close that a finger or thumb of a person gripping the cup body at the band will engage only small area peak portions of the thin walled protuberances and not main body portions between the protuberances and rows and air circulating spacing will be provided between the protuberances of the rows and between the rows of the band and also between the thumb or finger portions engaging protuberances and rows thereof and body wall portions underlying and not contacted by said protuberance engaging thumb or finger portions, the protuberances in alternate rows are disposed in longitudinal alignment and are staggered centrally between lines of like alignment of the protuberances in the rows with which said first mentioned alternate rows are alternated.

8. A cup structure of the character described comprising a thin walled generally frusto-conical body, a bottom, an open mouth and a finger gripping band extending about the body beneath the mouth, said band being composed of a plurality of rows of thin walled outward protuberances closely spaced in the direction of the length of the band and each row made up of protuberances symmetrically and closely spaced about the cup circumferentially, the spacing of said rows and the protuberances therein being so close that a finger or thumb of a person gripping the cup body at the band will engage only small area peak portions of the thin walled protuberances and not main body portions between the protuberances and rows and air circulating spacing will be provided between the protuberances of the rows and between the rows of the band and also between the thumb or finger portions engaging protuberances and rows thereof and body wall portions underlying and not contacted by said protuberance engaging thumb or finger portions, the protuberances in alternate rows are disposed in longitudinal alignment and are staggered centrally between lines of like alignment of the protuberances in the rows with which said first mentioned alternate rows are alternated, and wherein the peak portions of at least some of the protuberances are defined by wall portions bearing acute angular relation effective to hold liquid fillet-like portions in heat dissipating contact with said protuberances and against free circulation in hot liquid which may be contained in the cup.

9. A cup structure of the character described comprising a thin walled generally frusto-conical body, a bottom, an open mouth and a finger gripping band extending about the body beneath the mouth, said band being composed of a plurality of rows of thin walled outward protuberances closely spaced in the direction of the length of the band and each row made up of protuberances symmetrically and closely spaced about the cup circumferentially, the spacing of said rows and the protuberances therein being so close that a finger or thumb of a person gripping the cup body at the band will engage only small area peak portions of the thin walled protuberances and not main body portions between the protuberances and rows and air circulating spacing will be provided between the protuberances of the rows and between the rows of the band and also between the thumb or finger portions engaging protuberances and rows thereof and body wall portions underlying and not contacted by said protuberance engaging thumb or finger portions, the protuberances are generally triangular in shape and arched outwardly with the bases of such protuberance triangles arranged in circumferential alignment in the respective rows and each presenting a generally horizontal shoulder.

10. A cup structure of the character described comprising a thin walled generally frusto-conical body, a bottom, an open mouth and a finger gripping band extending about the body beneath the mouth, said band being composed of a plurality of rows of thin walled outward protuberances closely spaced in the direction of the length of the band and each row made up of protuberances symmetrically and closely spaced about the cup circumferentially, the spacing of said rows and the protuberances therein being so close that a finger or thumb of a person gripping the cup body at the band will engage only small area peak portions of the thin walled protuberances and not main body portions between the protuberances and rows and air circulating spacing will be provided between the protuberances of the rows and between the rows of the band and also between the thumb or finger portions engaging protuberances and rows thereof and body wall portions underlying and not contacted by said protuberance engaging thumb or finger portions, the protuberances are generally triangular in shape and arched outwardly with the bases of such protuberance triangles arranged in circumferential alignment in the respective rows and each presenting a generally horizontal shoulder forming with the connected arched wall portion an acute angle effective to hold liquid fillet-like portions in heat dissipating contact with said protuberances and against free circulation in hot liquid which may be contained in the cup.

11. A cup structure of the character described comprising a thin walled generally frusto-conical body, a bottom, an open mouth and a finger gripping band extending about the body beneath the mouth, said band being composed of a plurality of rows of thin walled outward protuberances closely spaced in the direction of the length of the band and each row made up of protuberances symmetrically and closely spaced about the cup circumferentially, the spacing of said rows and the protuberances therein being so close that a finger or thumb of a person gripping the cup body at the band will engage only small area peak portions of the thin walled protuberances and not main body portions between the protuberances and rows and air circulating spacing will be provided between the protuberances of the rows and between the rows of the band and also between the thumb or finger portions engaging protuberances and rows thereof and body wall portions underlying and not contacted by said protuberance engaging thumb or finger portions, the protuberances are generally triangular in shape and arched outwardly with the bases of such protuberance triangles arranged in circumferential alignment in the respective rows and each presenting a generally horizontal shoulder, and wherein the thin walled finger gripping band also includes outward grooving extending circumferentially thereabout and intersecting rows of the protuberances, and there also being stop means adjacent the bottom of the cup and engageable by a bottom portion of a like nested cup to determine the positioning of a cup within which it is nested, said stop means being cooperatively spaced with relation to said grooving and the protuberance rows so that the protuberances on a nested cup always will be lined up with the grooving in the cup in which it is nested and thus be cleared of any wall nesting contact of protuberances with said grooved band wall portions.

12. A cup structure of the character described comprising a thin walled generally frusto-conical body, a bottom, an open mouth and a finger gripping band extending about the body beneath the mouth, said band being composed of a plurality of rows of thin walled outward protuberances closely spaced in the direction of the length of the band and each row made up of protuberances symmetrically and closely spaced about the cup circumferentially, the spacing of said rows and the protuberances therein being so close that a finger or thumb of a person gripping the cup body at the band will engage only small area peak portions of the thin walled protuberances and not main body portions between the protuberances and rows and air circulating spacing will be provided between the protuberances of the rows and between the rows of the band and also between the thumb or finger portions engaging protuberances and rows thereof and body wall portions underlying and not contacted by said protuberance engaging thumb or finger portions, the protuberances are generally triangular in shape and arched outwardly with the bases of such protuberance triangles arranged in circumferential alignment in the respective rows and each presenting a generally horizontal shoulder forming with the connected arched wall portion an acute angle effective to hold liquid fillets in heat dissipating contact with said protuberances and against free circulation in hot liquid which may be contained in the cup, and wherein the thin walled finger gripping band also includes outward grooving extending circumferentially thereabout and intersecting rows of the protuberances, and there also being stop means adjacent the bottom of the cup and engageable by a bottom portion of a like nested cup to determine the positioning of a cup within which it is nested, said stop means being cooperatively spaced with relation to said grooving and the protuberance rows so that the protuberances on a nested cup always will be lined up with the grooving in the cup in which it is nested and thus be cleared of any wall nesting contact of protuberances with said grooved band wall portions.

13. A cup structure of the character described comprising a thin walled generally frusto-conical body, a bottom, an open mouth and a finger gripping band extending about the body beneath the mouth, said band being composed of a plurality of rows of thin walled outward protuberances closely spaced in the direction of the length of the band and each row made up of protuberances symmetrically and closely spaced about the cup circumferentially, the spacing of said rows and the protuberances therein being so close that a finger or thumb of a person gripping the cup body at the band will engage only small area peak portions of the thin walled protuberances and not main body portions between the protuberances and rows and air circulating spacing will be provided between the protuberances of the rows and between the rows of the band and also between the thumb or finger portions engaging protuberances and rows thereof and body wall portions underlying and not contacted by said protuberance engaging thumb or finger portions, the protuberances are generally triangular in shape and arched outwardly with the bases of such protuberance triangles arranged in circumferential alignment in the respective rows and each presenting a generally horizontal shoulder, and wherein each row of protuberances has the individual protuberances therein disposed in symmetrically staggered relation to the protuberances in adjacent rows.

14. A cup structure as defined in claim 11 wherein the outward grooving also is placed to present downward facing generally horizontal circumferentially aligned finger engaging shoulders.

15. A cup structure as defined in claim 3 wherein the stop means comprises an inwardly directed generally horizontal stop shoulder spaced above the bottom extremity and which is engageable as a support for the bottom extremity of a nested cup.

16. A cup structure as defined in claim 11 wherein the stop means comprises an inwardly directed generally horizontal stop shoulder spaced above the bottom extremity and which is engageable as a support for the bottom extremity of a nested cup.

17. A cup structure as defined in claim 3 wherein the stop means comprises an inwardly directed generally horizontal stop shoulder spaced above the bottom extremity and which is engageable as a support for the bottom extremity of a nested cup, the cup body including a cylindrical portion extending immediately above the stop shoulder and of a length considerably less than the spacing of the shoulder above the bottom extremity of the cup.

References Cited in the file of this patent

UNITED STATES PATENTS

| | | |
|---|---|---|
| 2,563,352 | Morse | Aug. 7, 1951 |
| 2,805,790 | Smucker | Sept. 10, 1957 |
| 2,859,557 | Lattuca | Nov. 11, 1958 |
| 2,889,072 | Lapham | June 2, 1959 |
| 2,905,350 | Edwards | Sept. 22, 1959 |
| 3,045,887 | Caine | July 24, 1962 |

FOREIGN PATENTS

| | | |
|---|---|---|
| 1,215,401 | France | Nov. 27, 1958 |